United States Patent [19]

Otani

[11] 4,111,621

[45] Sep. 5, 1978

[54] APPARATUS FOR MANUFACTURING ELECTRIC WIRE HAVING A COATED LAYER OF CROSS LINKED SYNTHETIC RESINOUS MATERIAL

[75] Inventor: Kanji Otani, Yokohama, Japan

[73] Assignee: Sumitomo Electric Industries, Ltd., Osaka, Japan

[21] Appl. No.: 697,095

[22] Filed: Jun. 16, 1976

[30] Foreign Application Priority Data

Jun. 17, 1975 [JP] Japan ................................. 50-73921

[51] Int. Cl.[2] ........................... B29F 3/10; B29C 1/04

[52] U.S. Cl. ..................................... 425/97; 425/104; 425/113; 425/446; 264/174

[58] Field of Search ............... 425/113, 376, 446, 445, 425/104, 97; 264/174, 176 R

[56] References Cited

U.S. PATENT DOCUMENTS

| | | | |
|---|---|---|---|
| 1,770,969 | 7/1930 | Cherry | 425/113 X |
| 2,069,087 | 1/1937 | Forstrom et al. | 425/113 X |
| 2,578,354 | 12/1951 | Henning | 425/113 X |
| 2,740,988 | 4/1956 | Henning | 425/113 |
| 3,513,228 | 5/1970 | Miyauchi et al. | 425/113 |

*Primary Examiner*—Robert L. Spicer, Jr.

*Attorney, Agent, or Firm*—Sughrue, Rothwell, Mion, Zinn and Macpeak

[57] ABSTRACT

A method and apparatus is disclosed which reduces the complexity of the apparatus needed to accomplish the cross linking reaction in the process of coating a synthetic resin material onto a conducting wire. A rotary orifice is provided just down stream of the extruder and just upstream of the forming die. The rotary orifice imparts a compressive and a shearing stress to the resin to thereby increase the temperature uniformly. The increase in temperature assists in bringing about the cross linking reaction.

6 Claims, 3 Drawing Figures

APPARATUS FOR MANUFACTURING ELECTRIC WIRE HAVING A COATED LAYER OF CROSS LINKED SYNTHETIC RESINOUS MATERIAL

BACKGROUND OF THE INVENTION

The present invention relates to a method of and apparatus for manufacturing electric wires having a coating of synthetic resin, wherein a synthetic resinous material, such as polyethylene, having a cross linking agent, such as an organic peroxide mixed therein, is extruded onto a electrically conductive wire and is subsequently subjected to a cross linking step to harden the resin.

High pressure steam has been commonly used to effect the cross linking step of a method of coating a wire with a synthetic resinous material having a cross linking agent, such as an organic peroxide, mixed therein. In some cases inactive gases of high pressure and temperature are used instead of the high pressure steam, for increasing the efficiency and elevating the quality of the product.

These known methods are inconvenient in that a very large apparatus is required to withstand the high pressure steam or gas. For example, steel pipes, which can withstand pressures of approximately 10 to 20 Kg/cm$^2$, are used as the reaction pipes within which the resin is hardened. In order to overcome this shortcoming, it has been proposed to directly connect the extruder for extruding the coating material onto the wire to a metal pipe in which the cross linking reaction is expected to be performed. In this method, a suitable lubricant is supplied into the reaction pipe, as well as into the extruding die, so that the extruded resinous material, partially hardened, can flow continuously into the pipe until the cross linking reaction is completed by the heat supplied from the outside of the pipe. The latter method is also unacceptable in that the length over which lubrication is required is very long, because a considerably long time is required for the synthetic resinous material to be cross linked and hardened completely by the heat delivered from the outside of the pipe so that the material must travel a correspondingly long distance.

Thus, the latter method suffers the following shortcomings:

(1) The equipment is uneconomically large.

(2) Complicated equipment is required for effecting uniform lubrication over the entire length of the long metal pipe.

(3) Considerable time and effort are required for replacing the die and the long metal pipe with another assembly, when a product of a different size is required.

(4) It is difficult to maintain the wire material coaxial with the coating layer, i.e. to obtain a concentric product, during the travel in the long pipe, especially when a heavy conductive body is to be coated by relatively thin coat layer.

The shortcomings of the prior art will become clearer from the following description of a longitudinal section of a prior art apparatus for effecting the cross linking reaction with a lubricated metal pipe, as shown in FIG. 1. The synthetic resinous material with a cross linking agent is kept at a temperature below the decomposition temperature of the agent, until it is fed to an extruding die 31. Therefore the resin is maintained in a fluid state. For example, at a point designated at A, the resinous material is kept at a temperature below 130° F. As the material advances into a pipe 33 for effecting the cross linking operation, a lubricant is supplied from a metal pipe lubricator 32. The material is gradually hardened as the reaction takes place by the heat transferred from a heater 34 through the pipe 33 and the lubricating oil film. The pipe 33 is kept at a temperature between 200° and 350° C. In this process, the speed of processing depends on the heat transfer, and it takes a considerable time for the resinous material extruded at a temperature lower than 130° C. to be evenly heated up to some 200° C. at which the reaction takes place, because the synthetic resinous material usually has poor heat conductivity. This means that the distance between the point A and a point B, at which cross linking is completed, is inevitably long and a correspondingly long metal pipe is required. For example, a metal pipe 33 would have to be 15 to 20 meters long to fabricate a 70 mm diameter wire with a coating which is 20 to 30 mm thick.

SUMMARY OF THE INVENTION

According to the invention, there is provided a method and an apparatus having a specific orifice disposed between a head block and a screw head of a screw type extruder. One wall constituting the orifice is rotatable and adapted for heating the fluidized synthetic resin passing therethrough to a uniform temperature. The resinous material is then delivered to a short pipe to accomplish the cross linking reaction.

DETAILED DESCRIPTION

Figure 1:
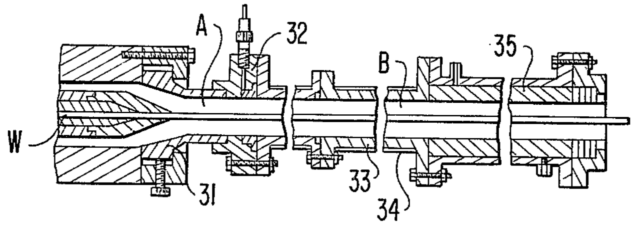
FIG. 1 PRIOR ART
FIG. 1 is a sectional view of a prior art internally lubricated cross linking pipe of conventional type.
Figure 3:
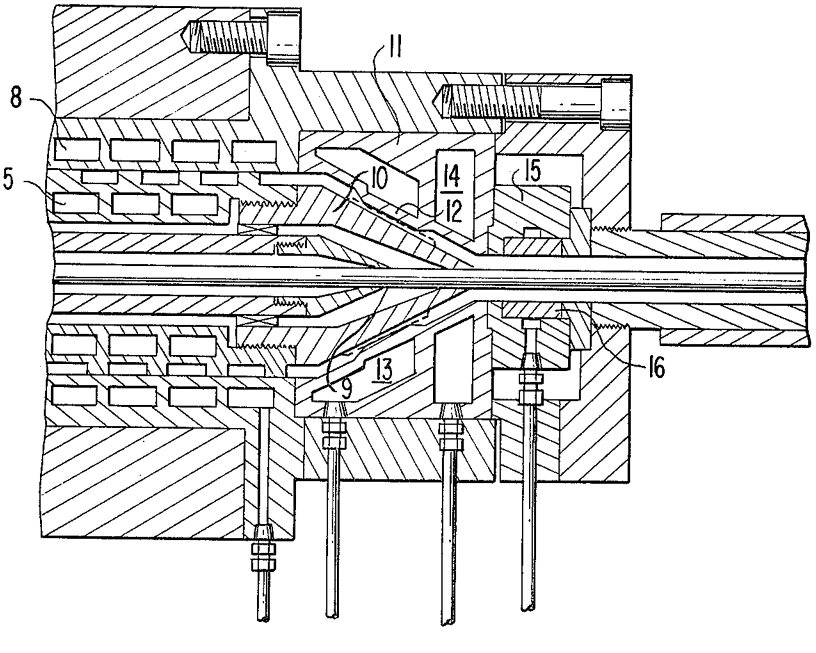
FIG. 3 shows in detail the forming head of the apparatus as shown in FIG. 2.
Figure 2:
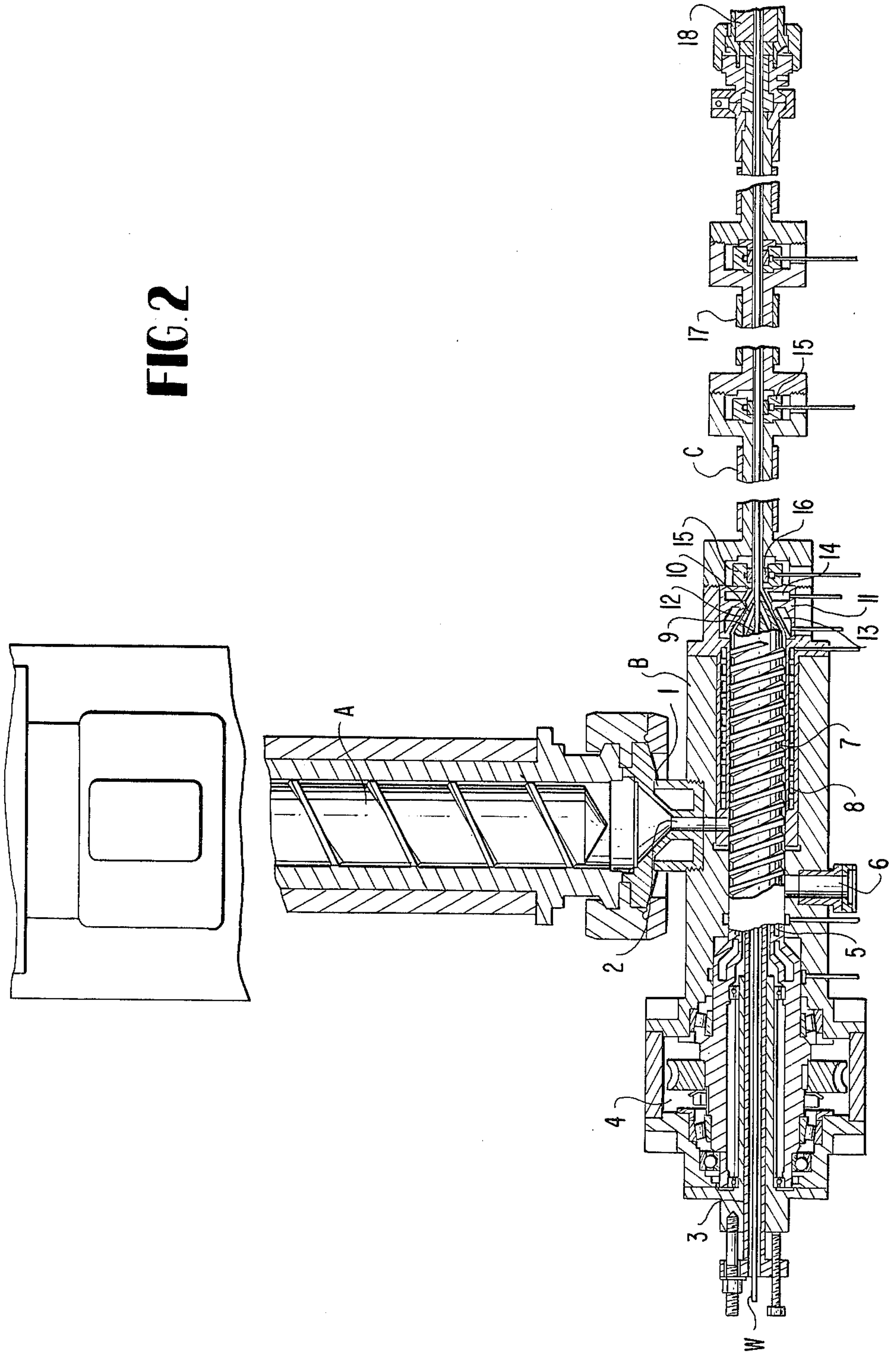
FIG. 2 is a longitudinal sectional view of an apparatus, a part of which has been omitted, for performing the method of the invention.

In the drawings, FIG. 2 is a longitudinal sectional view of an apparatus embodying the present invention, while FIG. 3 shows in detail the forming head used in the apparatus of FIG. 2. In FIGS. 2 and 3, which illustrates a two stage screw extruder, a first screw extruder, a second screw extruder and an internally lubricated metal pipe are designated, respectively, at A, B and C. The reference numeral 1 designates a junction between two screw extruders in which an intercommunication bore 2 is formed. The numeral 3 designates a point holder for the second screw extruder B, numeral 4 designates a speed reduction means, numeral 5 designates a screw jacket, numeral 6 a vent hole, numeral 7 a second screw, numeral 8 a barrel jacket, numeral 9 a point, numeral 10 a screw head, numeral 11 a forming head block, numeral 12 a special forming orifice, numeral 13 a forming head orifice jacket, 14 a forming head block jacket, 15 a forming die, 16 an internal surface lubricating means for the metal pipe, 16' a porous body of the means 16, 17 a heater for the metal pipe C, and 18 a cooling pipe.

A conductive wire W, which has been preheated by suitable preheating means (not shown) up to 90° to 110° C., is forwarded to the point holder 3 disposed in a hollow sleeve of the second screw extruder B, and is then fed through the extruder B and point 9 at the end of the point holder 3, to the forming die 15 where a synthetic resin coating is applied.

A synthetic resinous material, such as polyethylene in the form of a powder or granules, is fluidized during passage thru the first screw extruder A and is delivered to the second screw extruder B through the intercommunicating bore 2. The temperature of the molten or fluidized resinous material is about 125° to 127° C. The molten material then flows in the screw 7 of the second screw extruder.

In the conical passage, at the end of the screw 7, formed between the screw head 10 and the forming head block 11, an orifice 12 is formed by the radial projection of one or both of the members 10, 11 forming the conical passage. The forming head block projection is illustrated in FIGS. 2 and 3 while the optional screw-head projection is illustrated in dotted outline in FIG. 3. The temperature of the molten resinous material is adjusted to about 130° C. as it passes through the screw 7, and is then heated about 20° to 70° higher temperature by the transferred heat and the heat generated by the shearing caused by the rotation of the screw head 10 as the material passes the orifice 12. For example, the molten resinous material which has been heated up to 130° C. when leaving the screw 7 is further heated up to about 150° to 200° C. during passage thru the orifice 12. The temperature will reach about 240° C. in the case of some specific resinous materials. The material, having passed the orifice 12 and having been heated up to about 150° to 200° C., passes through a passage of enlarged diameter to the forming die 15 where it is regulated to the required diameter. Thereafter the shaped resin material and wire are supplied to the cross linking reaction pipe, which is connected to the second screw extruder B, a part of which commences the cross linking reaction.

In this embodiment, a metal pipe having lubricated internal surface is used as the bridge forming pipe, though it is not essential that such be used to practice the invention. Lubrication oil is supplied from the lubricator 16, and assists the coated wire W in sliding forward to the cooling pipe 18. The cross linking reaction is completed by the time the material reaches the cooling pipe 18.

The pipe 18 is pressurized and is adapted for effecting slow cooling of the hardened material. Although the cross linking reaction is mainly brought about by the even heat distribution established at the forming head orifice 12, the metal pipe C may be heated by a heater 17 to ensure the completion of the cross linking reaction. The temperature of the pipe C is determined depending on the temperature rise at the orifice 12, and is typically set to be about 200° to 300° C.

The forming head orifice incorporated in the apparatus of the invention is characterized by the following features:

(1) Since the forming head orifice is provided just before the forming die, the resinous material heated up by the orifice is directly fed to the die to be easily and satisfactorily formed thereat.

(2) Since the forming head orifice is a double tube orifice of relatively large diameter disposed at the conical portion of the screw head, it can provide a sufficient orifice effect even to a large quantity of flowing material.

(3) Since the forming head orifice is formed between the screw head and the forming head block by projecting at least one of them to reduce the cross-sectional area of the flowing passage, increased temperature results from the combined shearing effect caused by rotation of the screw head and the compressive effect caused by the reduced cross-section.

As explained above the combined shearing effect provided at the orifice 12 ensures that the resinous material will be uniformly heated to the temperature required for the cross linking reaction and, accordingly, the time required for completing the reaction is greatly shortened. This results in a shortening of the reaction pipe, such as the internally lubricated pipe, and a reduction in the cost and area required for installation.

I claim:

1. Apparatus for forming a cross linked synthetic resin coating on a conducting wire, comprising, an extruding means for extruding a synthetic resin having a crosslinking agent therein onto a conducting wire passing therethrough, a screw head and a forming head block positioned at the end of said extruder to form a conical passage for said resin extruded by said extruder, a forming die having a cylindrical passage positioned to receive said wire and said resin which passes through said conical passage to shape the resin around said wire, at least one of said screw head and said forming head block having a projection which extends into said conical passage to form an orifice wherein the temperature of said resin is raised to assist the cross linking reaction, and a cross linking reaction pipe positioned downstream of said forming die for receiving said wire and resin coating.

2. Apparatus as claimed in claim 1 wherein one of said screw head and said forming head block rotate relative to one another to apply a rotary shearing force to said resin as it passes through said orifice.

3. Apparatus as claimed in claim 2 wherein said extruding means is a two stage extruder, said orifice being provided at the downstream side of the second extruder stage.

4. Apparatus as claimed in claim 1 wherein said screw head projects into said conical space and rotates.

5. Apparatus as claimed in claim 1 wherein said forming head block projects into said conical space and rotates.

6. Apparatus as claimed in claim 1 wherein said reaction pipe is a metal pipe having means for lubricating the inner surface thereof.

* * * * *